United States Patent [19]

Sturges, Jr. et al.

[11] Patent Number: 4,521,844

[45] Date of Patent: Jun. 4, 1985

[54] MANIPULATOR CONTROL SYSTEM AND APPARATUS FOR DECONTAMINATING NUCLEAR STEAM GENERATORS

[75] Inventors: Robert H. Sturges, Jr.; Joseph J. Birsa; Paul H. Dawson, all of Plum Borough; Roger G. Byford, Washington Township, Armstrong County, all of Pa.

[73] Assignee: Westinghouse Electric Corp., Pittsburgh, Pa.

[21] Appl. No.: 384,691

[22] Filed: Jun. 3, 1982

Related U.S. Application Data

[63] Continuation of Ser. No. 154,703, May 30, 1980, abandoned.

[51] Int. Cl.[3] .......................... G06F 15/46; B24C 3/32

[52] U.S. Cl. ...................................... 364/167; 51/411; 165/11 A; 165/76; 376/249; 364/174; 364/513; 414/728; 414/744 R

[58] Field of Search ............... 364/167, 174, 550, 551, 364/130, 400, 474, 513; 51/410, 411, 415, 416, 165.71; 165/76, 79, 11 A, 11 R; 318/560, 565; 414/728, 729, 744 R, 749, 909; 376/245, 249, 277, 463

[56] References Cited

U.S. PATENT DOCUMENTS

| | | | |
|---|---|---|---|
| 3,477,178 | 11/1969 | Hulbert, Jr. | 51/411 |
| 4,004,698 | 1/1977 | Gebelin | 165/76 |
| 4,025,764 | 5/1977 | Tack | 51/165.71 |
| 4,074,814 | 2/1978 | Cooper et al. | 165/76 X |
| 4,200,424 | 4/1980 | Gerkey et al. | 414/744 |
| 4,205,940 | 6/1980 | Golick | 165/11 A X |
| 4,214,309 | 7/1980 | Koide et al. | 51/165.71 |
| 4,219,976 | 9/1980 | Burack et al. | 51/411 |
| 4,271,471 | 6/1981 | Castner | 414/728 |
| 4,311,556 | 1/1982 | Iwamoto et al. | 376/249 |
| 4,347,652 | 9/1982 | Cooper, Jr. et al. | 165/11 A X |

*Primary Examiner*—Joseph F. Ruggiero
*Attorney, Agent, or Firm*—E. F. Possessky

[57] ABSTRACT

A manipulator control system uses a microprocessor to compute appropriate control parameters in order to maintain constant tangential velocity of a spray nozzle in relation to the inside surface of a spherical portion of a nuclear steam generator. The microprocessor also computes, in one of the three modes of operation, of the control system, appropriate control parameters for maintaining a predetermined distance between the nozzle and the center of the spherical enclosure.

19 Claims, 9 Drawing Figures

MANIPULATOR CONTROL SYSTEM AND APPARATUS FOR DECONTAMINATING NUCLEAR STEAM GENERATORS

This is a continuation of application Ser. No. 154,703, filed May 30, 1980 abandoned.

CROSS-REFERENCE TO RELATED APPLICATIONS

This application is related to U.S. Pat. No. 4,219,976 filed Aug. 1, 1978 in the name of R. D. Burack et al., entitled "Decontamination Machine and Method for Decontaminating Nuclear Steam Generator Channel Head" and copending application Ser. No. 029,598 filed Apr. 12, 1979, abandoned, in the name of R. T. Marchese, entitled "Decontamination Method", both of which are assigned to the assignee of the present application. This application is also related to copending application Ser. No. 063,324 filed July 8, 1979 U.S. Pat. No. 4,374,462 in the name of Wojcik et al, entitled "Decontamination Apparatus".

BACKGROUND OF THE INVENTION

This invention relates to decontamination apparatus and more particularly to apparatus for decontaminating components of nuclear power plants.

During the operation of nuclear power plants and similar apparatus, certain components become exposed to radiation and may develop a thin radioactive film on the surface of the component. From time to time, it is necessary to either inspect or repair these components of the nuclear reactor power plant. During the inspection or repair of the components, it is necessary for working personnel to enter the component or to be stationed in close proximity to the component whereby working personnel may be exposed to radiation emitted from the contaminated component. In some circumstances, the radiation field emitted from these components is such that a worker would receive the maximum permissible radiation dose in less than five minutes of working time. Such a situation means that a given worker may spend only a relatively short amount of time working on the inspection or the repair operation of the nuclear component. Having each worker spend a relatively short amount of time in the repair or inspection procedure, necessitates the use of many workers with each worker working a short time period in order to accomplish the desired procedure. While this may be an acceptable practice for minor inspections or repair procedures, this is not an acceptable practice where there is an extensive inspection or an extensive repair job to be performed. Where the procedure to be performed is a time-consuming procedure, it is likely that an unusually large number of highly trained personnel would be necessary to carry out the task. Such a situation may not only be unacceptable from a financial aspect, but may also be unacceptable from a manpower level aspect. Therefore, what is needed is a decontamination apparatus that reduces the radiation field in components of nuclear reactor power plants so that working personnel may perform operations thereon.

Apparatus has been described in the aforementioned copending application Ser. No. 063,324 for remotely directing a water-grit mixture toward the component to be decontaminated through a nozzle, for example, suspended from the tubesheet of a steam generator. However, the position and tangential velocity of the nozzle in relation to the surface component to be decontaminated must be controlled so that the force of the water-grit mixture is sufficient to provide adequate cleaning and decontamination but not enough to damage the surface of the component. Inadequate cleaning and decontamination may occur if the velocity of the nozzle is too high and/or if the nozzle is too far from the surface of the component to be decontaminated. Damage to the surface of the component to be decontaminated may also result if the nozzle velocity is too low or if the nozzle is too close to the surface of the component to be decontaminated.

SUMMARY OF THE INVENTION

Manipulator apparatus and a manipulator control system are provided for sweeping a nozzle about a pivot mechanism inside a spherical enclosure, for example, inside a primary inlet or outlet plenum of a nuclear steam generator. Means are attached to the nozzle for directing a water-grit mixture toward the inside surface of the inlet or outlet plenum in order to decontaminate the inside surface, that is, in order to abrasively remove contaminates from the inside surface.

The control system includes velocity means for governing the velocity of the nozzle so that the tangential velocity of the nozzle, that is, the velocity of the nozzle with respect to the inside surface, is maintained at a predetermined magnitude. The predetermined tangential velocity may be any velocity within a range of velocities chosen to be of a magnitude great enough so that the surfaces to be cleaned are not damaged by a prolonged exposure to the water-grit mixture but is of a magnitude low enough so that the exposure of the surfaces to be cleaned is long enough to provide adequate cleaning. Distance means are also included in the control system for adjusting the distance between the nozzle and the pivot mechanism according to certain command signals.

In one mode of operation, referred to as the bowl cleaning mode, the distance means operates so as to maintain a predetermined distance between the spherical center of the inlet or outlet plenum and the nozzle. In two other modes of operation, referred to as the divider plate cleaning mode and the tubesheet cleaning mode, the distance means operates to periodically adjust the distance between the spherical center and the nozzle by a fixed incremental distance.

In the bowl cleaning mode, the predetermined distance referred to may be any distance within a range of distances so that the distance between the surface to be cleaned and the nozzle is large enough so that the surface to be cleaned is not damaged by an exaggerated magnitude of pressure from the water-grit mixture directed by the nozzle but is a distance small enough so that the pressure exerted on the surface is great enough to adequately clean or decontaminate the surface to be cleaned. Likewise, in the tubesheet and divider plate cleaning modes the nozzle is maintained at a distance within a range of distances from the surfaces to be cleaned so that there is adequate cleaning of the surface to be cleaned but no damage thereto.

DESCRIPTION OF THE PREFERRED EMBODIMENT

Figure 1:
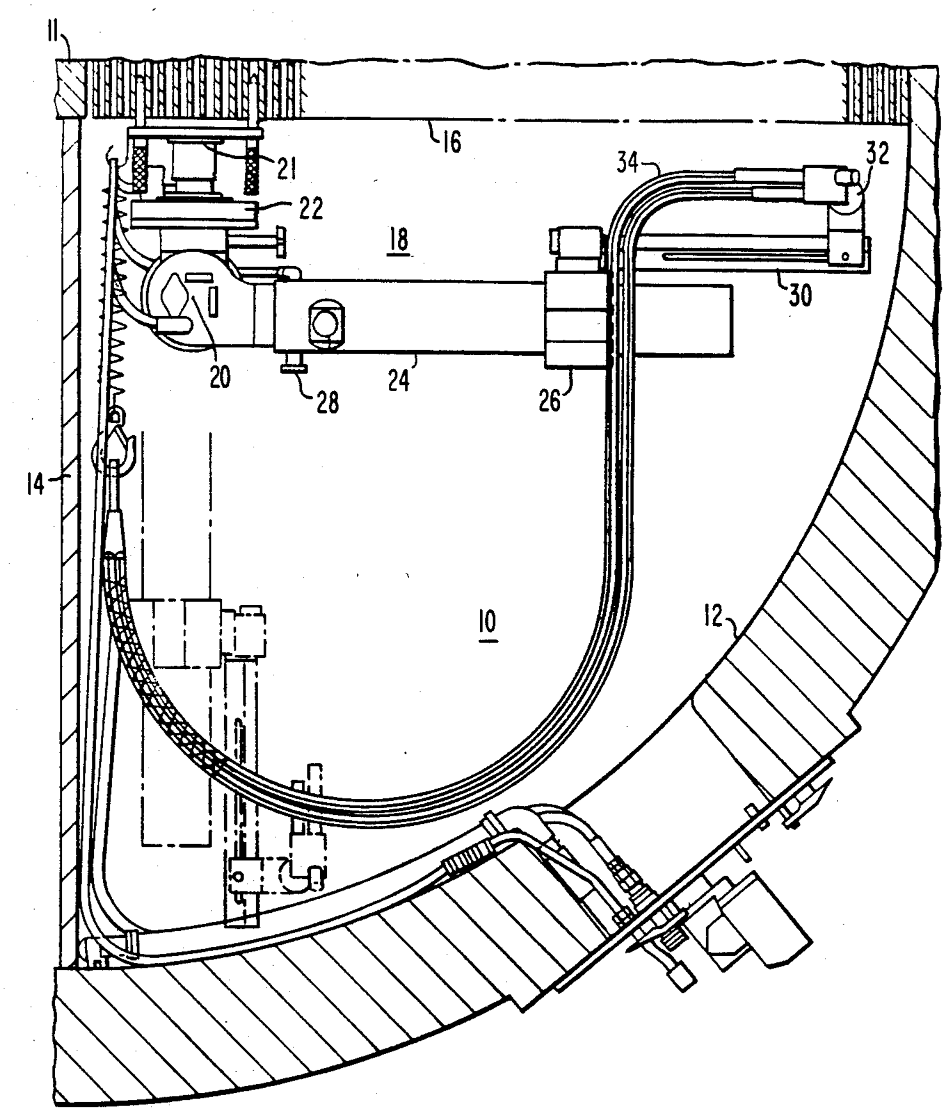
FIG. 1 shows apparatus contemplated for use in connection with the control system of the present invention.

FIG. 1 shows a primary inlet plenum 10 of a nuclear steam generator (not shown) having a generally spherical shape according to the teachings of the present invention. The inlet plenum 10 is characterized by a center 11, a curved inside (bowl) surface 12, a divider plate 14 and surface, and a tubesheet 16 and surface. As is well understood in the art, the tubesheet 16 is generally cylindrical having tube holes therein for attaching a tube bundle through which a fluid may flow. The dividing plate 14 defines the primary inlet and outlet plenums of the nuclear steam generator (not shown) of which only the primary inlet plenum 10 is shown in FIG. 1.

Apparatus for cleaning the surfaces 12, 14, and 16 include a control arm 18 mounted inside the spherical enclosure 10 on a pivot mechanism 20, which pivot 20 is supported from the tubesheet 16 by a support apparatus 22. The illustrated embodiment of the control arm 18 includes a support arm 24 extending directly from the pivot mechanism 20. A nozzle support carriage 26 is slidably mounted on the support arm 24. A carriage stop 28 is mounted on the support arm 24 near the pivot mechanism 20 in order to prevent the support carriage 26 from coming too close to the pivot support mechanism 20. A nozzle extension arm 30 having a nozzle end 31 is slidably mounted on the nozzle support carriage 26. Means including a nozzle configuration 32 and flexible conduits 34 are provided mounted on the nozzle extension arm 30 for cleaning surfaces surrounding the plenum 10 by directing a water-grit mixture having a constant pressure onto the surfaces to be cleaned, i.e., surfaces 12, 14 and 16. The conduit 34 serves as a means to conduct the water-grit mixture from a source to the nozzle configuration 32.

Distances important in describing the manipulator of the present invention and its operation include the distance from the center 11 of the spherical enclosure to the point 21 of attachment of the pivot support mechanism 22, the distance from the point 21 of attachment to the center of the pivot mechanism 20, the distance from the center of the pivot mechanism 20 to the carriage 26, the distance from the carriage 26 to the nozzle end 32, and the offset distance from the nozzle end 32 to the support arm 24.

Figure 2:
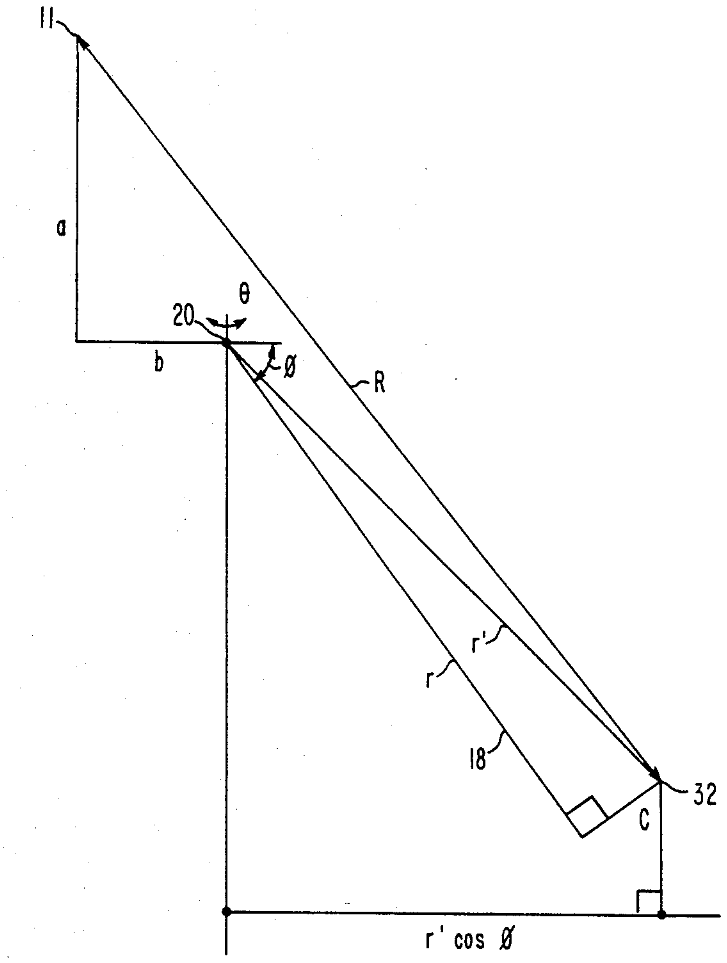
FIGS. 2, 3, and 4 show broad block diagrams of the control system of the present invention in varying degrees of detail.

A geometrical sketch of the control apparatus of FIG. 1 is shown in FIG. 2 for defining important relationships. As shown in FIG. 2, the following variables are defined:

a=the vertical distance from the center of the inlet plenum 10 to the center of the pivot mechanism 20;
b=the horizontal distance from the center 11 of the inlet plenum 10 to the center of the pivot mechanism 20;
c=the perpendicular distance from the center line of the control arm 18 to the nozzle configuration 32;
r′=the linear radius of the nozzle configuration 32 in relation to the pivot mechanism 20, i.e., the linear distance between the two;
r=the distance from the pivot mechanism 20 to a perpendicular line projected from the control arm 18 to the nozzle configuration 32;
R=the fixed distance in the bowl cleaning mode between the center 11 of the inlet plenum 10 and the nozzle configuration 32;
$\theta$=the angle of horizontal movement of the control arm 18, in the case of FIG. 2, going into and coming out of the paper;
$\phi$=the angle of vertical movement of the control arm 18, in the case of FIG. 2, in the plane of the paper;
$r' \cos \phi$=the effective radius of the nozzle configuration 32.

The triangulation equations for computing the most important variables, r and $r' \cos \phi$ are:

$$r = -B + \sqrt{B^2 + C^2} \quad (1)$$

where $$B = a \sin \phi + b \cos \phi \sin \theta$$

$$C = R^2 - a^2 - b^2 - c^2 - 2c[-a \cos \phi + b \sin \phi \sin \theta]$$

and $$r' \cos\phi = \sqrt{r^2 + c^2}\ (\cos\phi) \quad (2)$$

Figure 3:
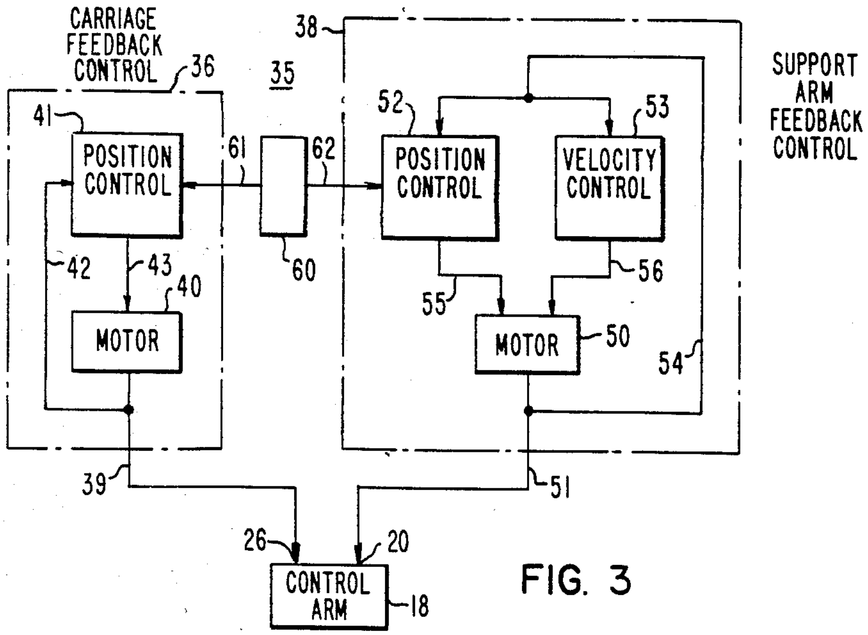

According to the teachings of the present invention, FIG. 3 shows a manipulator 35 provided for controlling the speed and direction of movement of the control arm 18 about the pivot mechanism 20 via a control signal 51 and for adjusting the position of the nozzle support carriage 26 on the support arm 24 via a control signal 39 in response to initiation signals 61 and 62. As shown in FIG. 3, the manipulator 35 includes a carriage feedback control within the lines at 36 for adjusting the position of the nozzle support carriage 26 and also includes a support arm feedback control within the lines at 38 for controlling the speed and direction of movement of the control arm 18 about the pivot mechanism 20. The initiation signals 61 and 62 are only for the purpose of initiating motion of the carriage 26 and the control arm 18.

Once motion is initiated by the initiation signals 61 and 62, the direction, velocity, and extent of motion is predetermined by parameters in the support arm control 38 and the carriage control 36. The carriage control means 36 and the support arm control means 38 may be suitably operated by initiation signals 61 and 62 to systematically clean or decontaminate any of the three surfaces surrounding the primary inlet plenum 10, that is, the surfaces 12, 14, and 16.

The carriage controller 36 includes a carriage position motor 40 suitably mounted on the nozzle support carriage 26 for adjusting the position of the nozzle support carriage 26 on the support arm 24 in order that the nozzle configuration 32 is not too close to nor too far from the bowl surface 12. Any adjustment by the motor 40 causing the nozzle configuration 32 to be too close to the bowl surface 12 may damage the surface 12 by exposing the bowl surface 12 to an extreme pressure from the water-grit mixture. Conversely, any adjustment by the motor 40 causing the nozzle configuration to be too far from the bowl surface 12 may not expose the surface 12 to sufficient pressure from the water-grit mixture to adequately clean the surface 12. A position control means 41 is responsive to feedback signal 42 from the motor 40 and to the initiation signal 61 for providing a control signal 43 for controlling the speed and direction of movement of the motor 40.

The support arm feedback control means 38 includes a motor means 50 suitably mounted relative to the pivot mechanism 20 for providing an output signal 51 for controlling the speed and direction of pivotal movement of the control arm 18 about the pivot mechanism 20. In particular, the pivotal movement of the control arm 18 occurs in the horizontal plane as measured by an angle $\theta$ and in the vertical plane as measured by an angle $\phi$. Position control means 52 and velocity control means 53 are responsive to a feedback signal 54 from the output of the motor 50 and to the initiation signal 62 for providing position control signals 55 and velocity control signal 56, respectively, in order to control the speed and direction of movement of the motor means 50. The support arm velocity control means 53 is significant in that it controls the angular velocity of the control arm 18 to be within a range of angular velocities neither too fast nor too slow. Any angular velocity too slow may cause damage to the surfaces to be cleaned, i.e., surfaces 12, 14 and 16, by exposing the surfaces to an extreme pressure from the water-grit mixture. Contrariwise, any angular velocity too fast may not expose the surface 12 to sufficient pressure from the water-grit mixture to adequately clean the surface 12.

Initiation means 60 provides the initiation signals 61 and 62, generally simultaneously, and may include means for manually providing the initiation signals 61 and 62, for example, a control console or panel having controls manually adjusted by an operator. The initiation means 60 may alternatively or additionally include means for automatically providing the initiation signals 61 and 62, for example, a microprocessor having programmed therein instructions for providing signals 61 and 62 in a proper sequence.

In accordance with the teachings of the present invention, the initiation means 60 is operative whether manually or automatically to provide at least three possible modes of cleaning operation, one for each of the surfaces to be cleaned, i.e., the divider plate surface 14, the bowl surface 12, and the tubesheet surface 16. In a first mode of operation referred to as the bowl-cleaning mode, the nozzle configuration 32 is swept along horizontal and vertical paths for cleaning the bowl surface 12. In a second mode of operation, referred to as the tubesheet cleaning mode, the control arm 18 is positioned horizontally and the nozzle configuration 32 is pointed upward in order to direct the water-grit mixture onto the tubesheet surface 16. The control arm 18 sweeps about the pivot mechanism 20 in a horizontal direction and the support carriage 26 incrementally adjusts along the control arm 18 in order to completely expose the tube sheet surface 16 to the water-grit mixture. In a third mode of operation, referred to as the divider plate cleaning mode, the control arm 18 is fixed in position at the end of a horizontal angular path such that the nozzle configuration 32 is close to and pointing in the direction of the divider plate surface 14. In order to completely expose the divider plate surface 14 to the water-grit mixture, the control arm 18 is swept through a vertical angular path and the support carriage 26 is incrementally adjusted along the total length of the support arm 18. Means may be included in the initiation means 60 for automatically or manually selecting one of the three modes, i.e., either the divider plate cleaning mode, the tubesheet cleaning mode, or the bowl-cleaning mode. Manually operated switches may be provided so as to allow manual control by an operator of the sequence of movement of the control arm 18 and the support carriage 26, or, automatic sequencing may be performed by a microprocessor having therein appropriate instructions.

Figure 4:
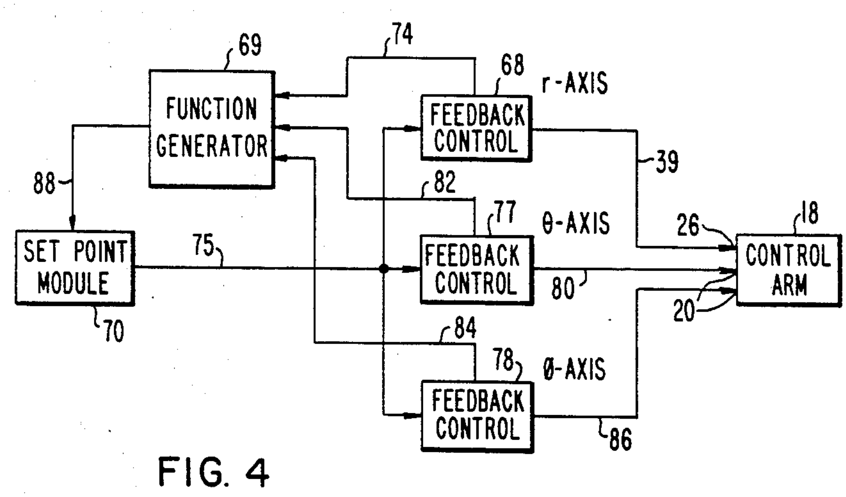

In FIG. 4, the carriage feedback control 36 of FIG. 3 includes, more specifically, a proportional feedback control 68, a function generator 69 and a set point module 70. The proportional feedback control 68 provides the control signal 39 to the control arm 18 and an output signal 74 to the function generator 69 in response to an output signal 75 from the set point module 70. Also in FIG. 4, the support arm feedback control 38 of FIG. 3 includes proportional feedback controls 77 and 78, the function generator 69, and the set point module 70. The proportional feedback control 77 is responsive to the signal 75 for providing a horizontal position signal 82 to the function generator 69 and a horizontal ($\theta$ axis) control signal 80 to the control arm 18 for controlling the speed of movement of the control arm 18 in a horizontal direction. The proportional feedback control 78 provides in response to the signal 75 a vertical position signal 84 to the function generator 69 and a vertical ($\phi$ axis) control signal 86 to the control arm 18 for controlling the speed of movement of the control arm 18 in a vertical direction. The function generator 69 provides an output signal 88 to the set point module 70 proportional to the computed commanded position of the nozzle end 32.

Figure 5:
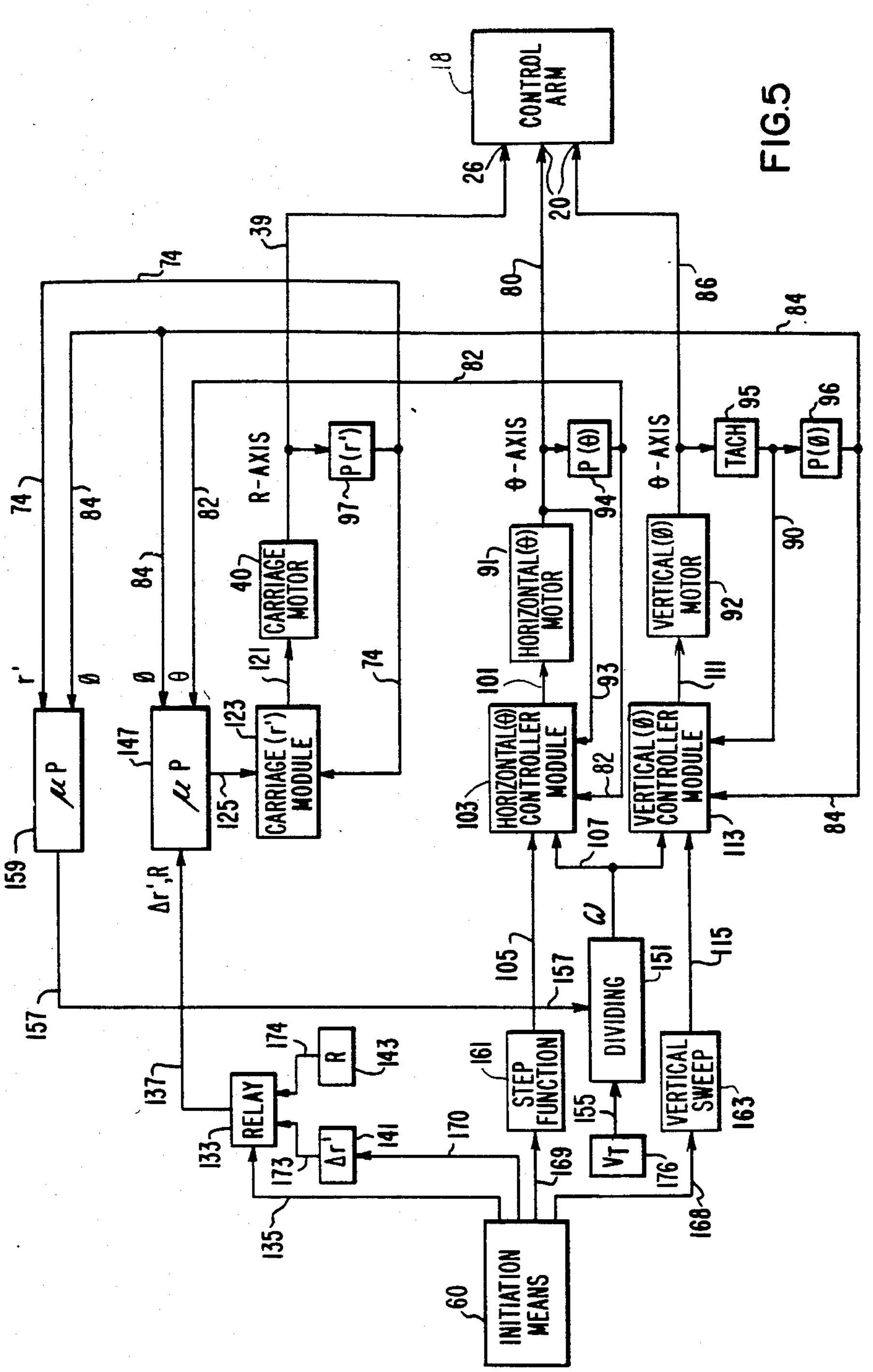
FIGS. 5, 6, 7, 8, and 9, show more detailed block diagrams of selected ones of the functional blocks in FIGS. 2 through 4.

FIG. 5 shows the manipulator 35 of FIG. 3 in still greater detail according to the teachings of the present invention. In FIG. 5, the motor means 50 of FIG. 3 includes horizontal and vertical pivot electric motors 91 and 92, respectively. Means 93 and 94 are included for sensing the horizontal angular velocity and the horizontal angular position, respectively, of the horizontal pivot motor 91. Means 95 and 96 are included for sensing the vertical angular ($\phi$) velocity and the vertical angular position ($\phi$), respectively, of the vertical pivot motor 92. The angular velocity sensing means 93 can be, for example, means for measuring the back emf of the horizontal pivot motor 91 and the angular velocity sensing means 95 can be, for example, a tachometer. Means including a potentiometer 97 are included for sensing the linear position of the carriage 26 on the support arm 24 as determined by the carriage position motor 40. The linear velocity of the carriage position motor 40 is not controlled externally.

The movement and speed of movement of the horizontal pivot motor 91 are controlled by a horizontal position ($\theta$) control signal 101 from a horizontal proportional controller module 103 in response to feedback from horizontal sensing means 93 and 94 and from a horizontal position ($\theta$) sweep or command signal 105 and an angular velocity command signal 107. The horizontal controller module 103 in conjunction with the horizontal pivot motor 91 governs the movement of the control arm 18 in the horizontal ($\theta$) direction essentially in response to the horizontal command signals, that is, horizontal velocity signal 107 and horizontal position ($\theta$) signal 105. The horizontal angular velocity feedback signal 93 and the horizontal angular position ($\theta$) feedback signal 82 provide an indication of the actual horizontal angular velocity and actual horizontal angular position $\theta$ of the horizontal pivot motor 91. The controller module 103 is operative to adjust the horizontal angular velocity and horizontal angular position ($\theta$) of the horizontal pivot motor 91 in order to cause the appropriate horizontal feedback and command signals to match each other.

The horizontal position ($\theta$) signal 105 can be, for example, a step function signal in the bowl and tube sheet cleaning modes having one state indicative of the command that the horizontal angular position ($\theta$) of the horizontal pivot motor 91 be such that $\theta=0°$ and having another state indicative of the command that the horizontal angular position ($\theta$) of the horizontal pivot motor 91 be such that $\theta=180°$. Means for providing the horizontal angular position ($\theta$) signal 105 may include, for example, means 161 for providing a step function in response to a horizontal initiation signal 169 from the initiation means 60.

The vertical movement and the angular velocity of the vertical movement of the vertical pivot motor 92 are controlled by a vertical position control signal 111 of a vertical proportional controller module 113 in response to feedback from vertical sensing means 95 and 96 and from a vertical position sweep signal 115 and the angular velocity command signal 107. The vertical controller module 113 in conjunction with the vertical pivot motor 92 governs the movement of the control arm 18 in the vertical ($\phi$) direction essentially in response to the vertical command signals, that is, angular velocity command signal 107 and vertical ($\phi$) position signal 115. The vertical angular velocity feedback signal 90 from the tachometer 95 and the vertical angular position ($\phi$) feedback signal 84 from the potentiometer 96 provide an indication of the actual vertical angular velocity and actual vertical angular position ($\phi$) of the vertical pivot motor 92. The controller module 113 is operative to adjust the vertical angular velocity and the vertical angular position of the vertical pivot motor 92 in order to cause the appropriate vertical feedback and command signals to match each other.

The vertical position signal ($\phi$) 115 can be, for example, a step function signal in the divider plate cleaning mode having one state indicative of the command that the vertical angular position ($\phi$) of the vertical pivot motor 92 be such that $\phi=0°$ and having another state indicative of the command that the vertical angular position ($\phi$) of the vertical pivot motor 92 be such that $\phi=180°$. Alternatively, the vertical position ($\phi$) signal 115 can be, for example, a staircase signal in the bowl-cleaning mode having a plurality of discrete increments in magnitude such that the vertical angular position ($\phi$) of the vertical pivot motor 92 sweeps through a 90° path from $\phi=0°$ to $\phi=90°$ in fixed predetermined angular increments. Means for providing the vertical angular position signal 115 may include, for example, means 163 for providing a step function and for providing a staircase function in response to a vertical movement initiation signal 168 from the initiation means 60.

The linear movement of the carriage position motor 40 is controlled by a carriage position control signal 121 from a proportional controller module 123 in response to feedback from the carriage position sensing means 97 and inputs from a carriage command signal 125. The carriage controller module 123 in conjunction with the carriage position motor 40 governs the movement of the support carriage 26 on the support arm 24 essentially in response to the carriage command signal 125. The carriage position feedback signal 74 from the potentiometer 97 provides an indication of the actual position of the carriage motor 40. The controller module 123 is operative to adjust the position of the carriage motor 40 in order to cause the carriage feedback and command signals to match each other.

A radius computation bus signal 137 is provided by a relay means 133 in response to a relay control signal 135. The radius computation bus signal 137 will be the same as one of carriage radius computation signals 173 or 174 depending upon the position of the relay means 133 determined by the relay control signal 135. The carriage radius computation signal 174 used in the bowl-cleaning mode is proportional to the distance between the center 11 of the primary inlet plenum 10 and the nozzle configuration 32. Carriage radius computation means 143 are included for providing the carriage radius computation signal 174 and may include a potentiometer appropriately adjusted to provide the proper carriage radius computation signal 174.

Figure 8:
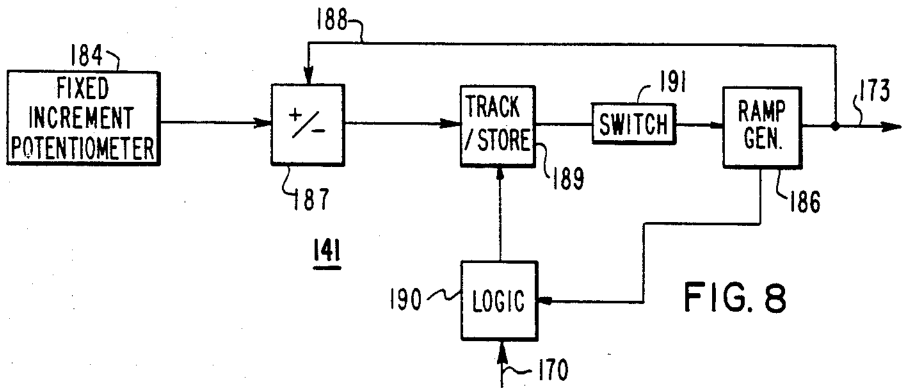

The carriage radius computation signal 173 used in the tubesheet and divider plate cleaning modes is proportional to a fixed, predetermined incremental distance which the nozzle support carriage 26 is desired to be moved. Referring to FIG. 8, the carriage radius computation means 141 includes increment means 184 for providing a predetermined distance of linear radius adjustment for the support carriage 26. The incremental adjustment is performed essentially by a ramp generator 186. Means 187 are included for adding to or subtracting from the output of the ramp generator 186 the fixed increment derived from the increment means 184, in response to a feedback signal 188 from the output of the ramp generator 186. The output of the means 187 referred to as an "update" signal is always the same as that of the ramp generator 186 plus or minus the fixed increment provided by the increment means 184. In fact, the output of the means 187 is the current linear radius or position of the support carriage 26 on the control arm 18 plus or minus the fixed increment. A track/store means 189 operates the ramp generator in response to a signal from a logic means 190.

In operation of the instruction means 141, a linear movement initiation signal 170 from the initiation means 60 causes the logic means 190 to provide an increment initiation signal to the track/store module 189 thereby causing the track/store module 189 to "hold" the "update" signal at its input—the "update" signal being the output of the means 187. The "update" signal is also provided as an input to the ramp generator 186. The ramp generator 186 operates to adjust (increase or decrease) its output so that its output, that is, signal 188, matches the output of the track/store module 189.

The ramp generator 186 provides a signal to logic means 190 for removing the increment initiation signal in response to the matching of the output signals of the ramp generator 186 and the track/store module 189. The removing of the increment initiation signal from the input of the track/store module 189 causes the track/store module 189 to "track-up" or "track-down" to the output of the means 187, that is to the output of the ramp generator 186 plus or minus the fixed increment from the increment means 184. Means 191 are included for causing the input of the ramp generator 186 to float, that is to cause the ramp generator input to be disconnected from the track/store output, in response to the removing of the increment initiation signal.

A part 147 of a microprocessor provides the carriage command signal 125. In the bowl-cleaning mode, the relay means 133 is positioned in response to the relay control signal 135 such that the carriage radius computation signal 174 is coupled to the microprocessor 147 via the radius computation bus signal 137. In this mode, the microprocessor 147 provides the carriage command signal 125 in response to the position feedback signals 82 and 84 and the radius computation bus signal 137 in order to adjust the position of the support carriage 26 such that the nozzle 32 is maintained at the distance R from the center 11 of the primary inlet plenum 10 of FIG. 1. The microprocessor 147 accepts as inputs the position feedback signals 82 and 84 and the radius computation bus signal 137 and performs the triangulation computation shown in equation (1).

In the tubesheet and divider plate cleaning modes, the relay means 133 is positioned in response to the relay control signal 135 such that the carriage radius computation signal 173 is coupled to the microprocessor 147 via the radius computation bus signal 137. In these two modes of operation, the position feedback signals 82 and 84 are essentially unused. The carriage command signal 125 is effective to cause the support carriage 26 to move incrementally along the support arm 18 in response to the carriage radius computation signal 173.

The angular velocity command signal 107 is provided as an output by a divider means 151. A potentiometer means 176 provides a tangential velocity signal 155 proportional to a predetermined tangential velocity of the nozzle 32. As discussed hereinbefore, the predetermined tangential velocity provided by the potentiometer means 176 must be within a range of tangential velocities such that the nozzle configuration 32 moves in relation to the surface to be cleaned at a speed fast enough so that the surface to be cleaned is not damaged, but at a speed slow enough so that the surface can be adequately cleaned by the water-grit mixture directed thereon through the nozzle 32. A microprocessor 159 provides an effective radius signal 157 as an input to the divider means 151. The divider means 151 is operative to form a quotient having the effective radius signal 157 as a divisor and having the tangential velocity signal 155 as a dividend. The angular velocity command signal 107 is proportional to the quotient formed in the dividing means 151.

In the bowl-cleaning mode, the microprocessor 159 accepts as inputs vertical position feedback signal 84 and carriage position feedback signal 74. The effective radius in this mode is determned as a function of the position feedback signals 74 and 84 according to the equation (2). In the tubesheet and divider plate cleaning modes, the vertical position feedback signal 84 is essentially unused and the effective radius signal 157 is essentially the same as the carriage position feedback signal 74. In the bowl-cleaning mode, vertical angular movement of the control arm 8 is suspended and the motor 91 sweeps the control arm 18 in a horizontal direction in response to the horizontal angular position signal 105. In the process of the horizontal sweep, the control arm 18 covers an angular path measured by the angle $\theta$ of FIG. 2, where $\theta$ can range from 0° to 180°. At the end of the horizontal path, that is where $\theta=0°$ or where $\theta=180°$, vertical movement is enabled and horizontal movement discontinues. The control arm 18 is then swept vertically along an incremental angular vertical path measured by the angle $\theta$ of FIG. 2. In this mode of operation, the angular coverage of the vertical path is, for example, on the order of $\phi=2°$. After this incremental vertical sweep, vertical movement is suspended and the control arm 18 is caused to sweep horizontally in the opposite direction. The incremental vertical sweep occurs at the end of each horizontal path until the total angular coverage by the multiple incremental vertical sweeps equals 90°. Throughout the operation of the control arm in the bowl-cleaning mode, the nozzle configuration 32 of FIG. 1 is caused to remain a predetermined distance from the center 11 of the spherical enclosure 10. This is performed by the proportional controller module 123 in response to the position control signal 125 and feedback from the linear position signal 74. The signal 174 is proportional to the predetermined distance R of FIG. 1 which is provided by the instruction means 143. Relay means 133 in response to the signal 135 operates such that the signal 137 is the same as the signal 174. The horizontal angular velocity of the motor 91 and the control arm 18 is adjusted such that the tangential velocity of the nozzle configuration 32 with respect to the bowl surface 12 of the primary inlet plenum 10 is maintained at a predetermined tangential velocity $V_T$ derived from potentiometer means 176. The proper angular velocity to achieve the predetermined tangential velocity is performed by the dividing means 151 in response to the tangential velocity signal 155 and the effective radius signal 157. The angular velocity of the incremental vertical sweep occurring at the end of each horizontal path is adjusted in a similar manner to achieve the predetermined tangential velocity at the nozzle configuration 32 with respect to the bowl surface 12.

In the tubesheet cleaning mode, the vertical position of the control arm 18 is such that the angle $\phi$ is $\phi=0$ and vertical movement is suspended. The control arm 18 sweeps about the pivot mechanism 20 in a horizontal direction along a path such that the angle $\theta$ ranges from 0° to 180°. The nozzle configuration 32 is pointed toward the tubesheet surface 16. The horizontal angular velocity of the control arm 18 is adjusted in the same manner discussed above such that the nozzle configuration 32 is maintained at the predetermined tangential velocity with respect to the tubesheet 16. At the end of each horizontal sweep path, that is where $\theta=0°$ or $\theta=180°$, the support carriage 26 is caused to move incrementally on the order of a distance of 2 inches. The incremental linear movement of the support carriage 26 is effected by the signal 173 from the instruction means 141. In the second mode of operation, the relay means 133 operates in response to the signal 135 such that the signals 137 and 173 are the same.

In the divider plate cleaning mode, the horizontal position of the control arm 18 is fixed such that the angle $\theta=180°$ or such that the angle $\theta=0°$ and horizontal movement is suspended. The control arm 18 sweeps through a vertical angular path such that the angle $\phi$ ranges from 0° to 90°. At the end of each vertical sweep path, that, where the angle $\phi$ is 0° or where the angle $\phi$ is 90°, the support carriage 26 moves incrementally along the support arm 24 a distance on the order of 2 inches such that the total of the incremental linear movements of the carriage 26 causes it to move from end of the support arm 24 to the other as a result of the incremental movements at the end of each vertical sweep path. The linear incremental movement of the support carriage 26 is performed in the same way as discussed above with respect to the second mode of operation.

Figure 6:
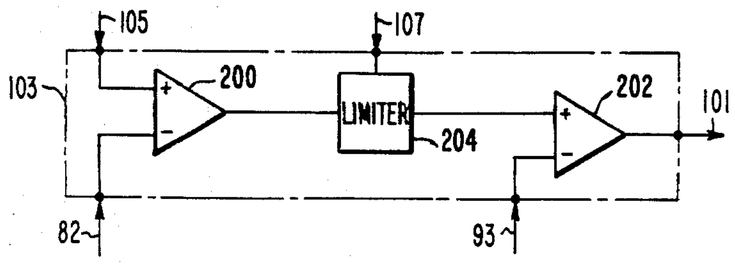

FIG. 6 shows a block diagram of a preferred embodiment of the proportional controllers 103 and 113 of FIG. 5 according to the teachings of the present invention. For purposes of simplicity, only the proportional controller 103 is described in FIG. 6. The controller 103 includes operational amplifiers 200 and 202 having feedback signals 82 and 93 coupled to respective inverting inputs. A programmable limit circuit 204 is coupled between the amplifiers 200 and 202 and includes as an input the velocity set point signal 107. The limit circuit 204 may be, for example, a circuit of the type included in Action Pack 4300-112 manufactured by the Action Instrument Co. The position set point signal 105 is coupled to the non-inverting input of the amplifier 200.

Figure 7:
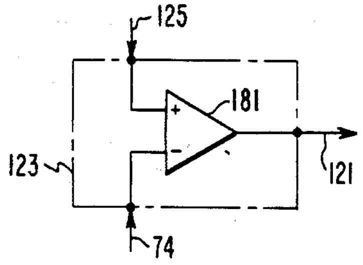

FIG. 7 shows a block diagram of a preferred embodiment of the proportional controller 123 according to the teachings of the present invention. The proportional controller 123 is similar in design to the controllers 103 and 113 as shown in FIG. 6 except that there is no velocity feedback signal. The motor 40 is free to move at its inherent speed, however fast or slow that speed is. The proportional controller 123 includes essentially an operational amplifier 181 having as inputs position feedback signal 74 coupled to the inverting input and position set point signal 125 coupled to the non-inverting input.

Figure 9:
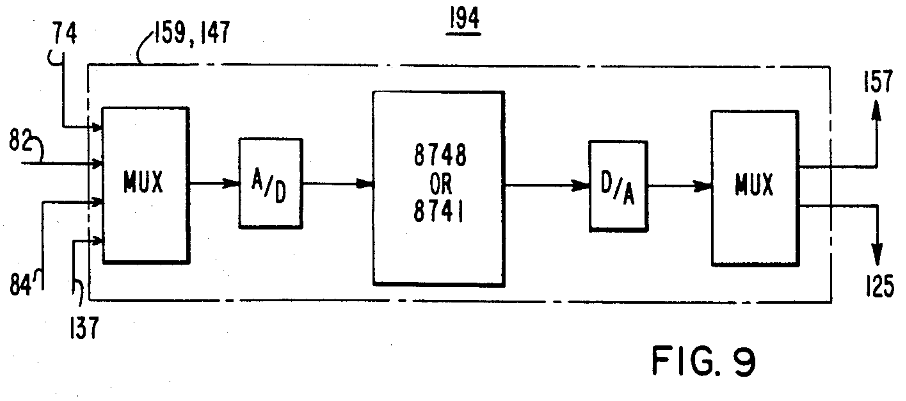

The microprocessor computation means 147 and 159 can be, for example, a circuit 194 as shown in FIG. 9 including an appropriately programmed microprocessor, for example, an INTEL 8748 or 8741 having associated multiplexers (MUX) and A/D and D/A converters for providing outputs 125 and 157 in response to inputs 82, 84, and 137, and inputs 74 and 84, respectively.

APPENDIX

The following appendix is an assembly language listing of a preferred embodiment of a program for use with the microprocessor of FIG. 9. The listing is included in order to provide greater detail which provides a fuller understanding of the invention.

```
LOC  OBJ        SEQ        SOURCE STATEMENT

                 0
                 1                    ;ALL ARITHMETIC IS DONE IN UNITS OF RFS,
                 2                    ;WITH RFS = OEFFH.
                 3                    ;  BINARY POINT IS THEREFORE TO THE LEFT OF THE MSB.
                 4                    ;
                 5                    ;                MEMORY USAGE
                 6                    ; PHIPTR - 2 ;TEMP STORAGE DURING NOZZEL OFFSET LOW BYTE)
                 7                    ; PHIPTR -1  ; MODIFICATIONS TO SQR RT TERM    HIGH BYTE)
                 8                    ; PHIPTR     ;PHI (OR 180 - PHI)
                 9                    ; PHIPTR +1  ;THETA ( OR 180 - THETA)
                10                    ; PHIPTR +2  ;VOFF* SIN(PHI) LOW BYTE(LATER B LOW BYTE
                11                    ; PHIPTR +3  ;VOFF * SIN(PHI)=A SINO+KCOSOSINO
                12                    ;                          HIGH BYTE(LATER B HIGH BYTE
                13                    ;PHIPTR +4   ;COS (PHI)
                14                    ;PHIPTR +5   ;R**2 LOW BYTE
                15                    ;PHIPTR +6   ;R**2 HIGH BYTE
                16                    ;
                17
                18                     ;APTR           ;VOFF(ADJUSTED BY DIP SWITCH SETTINGS)
                19                    ;APTR +1      ; HOFF (              "                )
                20                    ;
                21
                22                    ;CALCULATION IS:
                23                    ; SMALL R =-B+SQRT(B**2+C)
                24                    ;  WHERE B= HOFF*COS(PHI)*SIN(THETA)+VOFF*SIN (PHI)
                25                    ;   AND  C= BIG R **2-VOFF**2-HOFF**2-NOFF**. 2*
                26                    ;           HOFF * NOFF * SIN(PHI)*SIN(THETA)+2*
                27                    ;           VOFF*NOFF*COS(PHI). LAST THREE TERMS ARE
                28                    ;           NOZZEL OFFSET MODIFICATIONS.
                29                    ; ADC OUTPUT AND DAC BUFFER LATCH INPUT ARE ATTACHED TO
                30                    ; CPU DATA BUS. DEVICE CONTROLS ARE ON PORT 1 (SEE COMMENT
                31                    ; FOR START INSTRUCTION AT 00AH), AND DIP SWITCHES FOR
                32                    ; VOFF AND HOFF ADJUST ARE ON P2.
0030            33  PHIPTR  EQU       48
                34                                      ;      TWO
003C            35  APTR    EQU        60               ;STORAGE POINTERS
00EA            36  RFS     EQU       234
                37
                38                                      ;FULL SCALE FOR R IN1/4 OF IN.
005C            39  RZERO   EQU     92
                40
                41                                      ;ZERO FOR R
0054            42  HOFF    EQU       84
                43
                44                                      ;HORIZONTAL DISTANCE OF PIVOT POINT
                45                                      ;FROM CHANNEL.
006A            46  VOFF    EQU       106      ;VERT. DIST. OF PIVOT PT. FROM HEAD CENTER
0059            47  NOFF    EQU       89      ;NOZZEL OFFSET (UPWARDS FROM CL OF ARM)
007F            48              EXLEN EQU      127        ;LENGHT OF ARM EXTENSION
0094            49  ARMLEN  EQU       148      ;MINIMUM ARM LENGTH (PIVOT TO CARRIAGE)0
00BF            50  TRAVEL  EQU       191      ;CARRIAGE TRAVEL
008E            51  RRANGE  EQU       RFS-RZERO      ;=IN 1/8 IN.
0064            52  RZEROH  EQU       RZERO*256/RFS      ;CALCULATE 16 BIT VALUES FOR THE ABOVE
00A4            53 RZEROL   EQU     ((RZERO*256) MOD RFS)*256/ RFS
002D            54 HOFFH    EQU     HOFF *128/ RFS
00F2            55  HOFFL   EQU      (( HOFF *128) MOD RFS )*256 / RFS
0039            56 VOFFH    EQU     VOFF * 128 / RFS
00FB            57  VOFFL   EQU      ((VOFF * 128 ) MOD RFS ) * 256 / RFS
0045            58  EXLENH  EQU      EXLEN * 128 / RFS
ISIS-II 8048 ASSEMBLER, V1.2
```

```
0078          EXLENL  EQU     (( EXLEN * 128 ) MOD RFS ) *256 / RFS
0050          ARMLNH  EQU     ARMLEN * 128 / RFS
00F5          ARMLNL  EQU     (( ARMLEN * 128 ) MOD RFS ) * 256 / RFS

0030          NOFFH   EQU     NOFF*128 / RFS
00AF          NOFFL   EQU     ((NOFF * 128) MOD RFS)*256 /RFS
009C          CBRSRH  EQU     ( 256 * RFS ) / ( 2 * TRAVEL)   ;CONVERSION FACTOR BIG R F S TO TRAVEL X 4 F S
0025          CBRSRL  EQU     (( 256 * RFS ) MOD ( 2 * TRAVEL )) * 256 / (2 * TRAVEL )
                      ; NOTE FACTOR OF EIGHT
0068          CSRBRH  EQU     (128 * TRAVEL ) / RFS   ;CONVERSION -TRAVEL TO BIG R
007A          CSRBRL  EQU     (( 128 * TRAVEL ) MOD RFS ) * 256 / RFS
002D          RMINNE EQU((VOFF/2*VOFF/2+HOFF/2*HOFF/2+ARMLEN/2*ARMLEN/2)/RFS)*64/RFS*4+1
006D          RMINE EQU((VOFF/2*VOFF/2+HOFF/2*HOFF/2+(ARMLEN/2+EXLEN/2)*(ARMLEN/2+EXLEN/2))/RFS)*64/RFS*4+1 ;
0098          RMAXNE EQU((VOFF/2*VOFF/2+HOFF/2*HOFF/2+(ARMLEN/2+TRAVEL/2)*(ARMLEN/2+TRAVEL/2))/RFS)*64/RFS*4
00FF          RMAXE   EQU OFFH                                          ;VALUES OF
009B          CRINH   EQU     RRANGE * 256 / RFS                                  ;R SQUARED IN E
0059          CRINL   EQU     (( RRANGE * 256 ) MOD RFS ) *256 /RFS
00E9          RPFS    EQU     (EXLEN + ARMLEN + TRAVEL) /2        ;EXTENDED (XXXXNE)MODES
0080          CBRRPH  EQU     256 * RFS / (2 * RPFS )  ;CONVERT 23° 0 VOLTS RFS 10 VOLTS
0000          CBRRPL  EQU     ((256 * RFS ) MOD ( 2 * RPFS )) * 256 / (RPFS * 2) ;TO 0° 0 VOLTS RFS 10 VOLTS
                      ; NOTE FACTOR OF 2                                  ;FULL SCALE 4 S
0000
0000 040A                ORG 0
                         JMP START                  ;CONVERT RFS TO SMALL R PRIME F S
0003                    ORG 03H                         ;STARTS FROM 0 AT PWR UP
0003 15                 DIS I                ;DISABLE EXTERNAL
0004 93                 RETR                 ;INTERRUPTS
0007                    ORG 07H
0007 35                 DIS TCNTI            ;DISABLE TIMER
0008 93                 RETR                 ;INTERRUPTS
000A                     ORG 0AH
000A 2378      START:   MOV A,#78H            ;LOCATIONS 3-9 RESERVED
000C 39                  OUTL P1,A
000D 85                  CLR F0                   ;P1 HAS R OUT OF RANGE ALARM IN MSB
000E 95                  CPL F0               ;MUX ADDRESS IN 3 LSB ADC CONVERT/IN B 3
000F 2330               MOV A,#30H            ;AND THE #3 DAC LATCH CONTROLS IN BITS 4
0011 3A                 OUTL P2,A            ;DISABLE ALL
0012 2490                JMP RUN             ;F2 I/O PORTS
                                              ;(SMALL R),5(SMALL  R PRIME)
                                         ;AND 6(SMALL R PRIME *COS(PHI)
0014 27        PIN:     CLR  A
0015 D5                SEL RB1          ;THE UPPER REGISTER BANK IS SELECTED
0016 8A20               ORL P2,#20H           ;SET BIT 5 =1,BIT 4=0 TO CLOCK DATA IN
0018 9AEF               ANL P2,#0EFH          ;SET BIT 4=0 AND CLOCK DATA IN
001A 0F                 MOVD A,P7             ;4 BITS OF DATA IN LOWER 4 BITS OF ACC
001B 47                 SWAP A                ;LOWER 4 BITS BECOME HIGH AND VISE VERSA
001C A8                 MOV R0,A              ;STORE HI BYTE OF DATA IN TEMP+1
001D 0E                 MOVD A,P6             ;4 BITS OF DATA IN LOWER 4 BITH OF ACC
001E 68                 ADD A,R0              ;HI BYTE+LO BYTE IN ACC
001F C5                SEL RB0               ;THE REGISTER BANK IS RESET
0020 8A30              ORL P2,#30H            ;RESET BITS 4&5 TO 1S
0022 83                 RET
0023 8A20      POUT:    ORL P2,#20H           ;SET BIT 5=1,SHUTOFF VOFF&HOFF SWITCH DATA
0025 9AEF               ANL P2,#0EFH          ;SET BIT 4=0
0027 3C                 MOVD P4,A             ;MOVE 4 LOWER BITS OF ACC TO PORT4
0028 47                 SWAP A                ;SWAP LOWER AND HIGHER 4 BITS OF ACC
0029 3D                 MOVD P5,A             ;MOVE LOWER 4BITS OF ACC TO PORT 5
002A 8A30               ORL P2,#30H           ;DISABLE I/O PORTS
002C 83                 RET
0030                     ORG 30H                ;F0 IS A 1 IF R IS IN RANGE
0030 6C        DADD1:    ADD A,R4                  ;DOUBLE PRECISION ADD ROUTINES R3,A+R2,R4, INTO
0031 2B                  XCH A,R3               ;R2,R4 UNCHANGED
```

```
0032 7A            ADDC A,R2
0033 2B            XCH A,R3
0034 83            RET
0035 97    DSUB1:  CLR C         ;DOUBLE SUBTRACT R7,R6-R3,A INTO R3,A R7,R6 UNCHANGED
0036 A7            CPL C         ;CARRY IS SET IF OVERFLO OCCURS.USES B-D=B+D/+1
0037 37            CPL A                 ;D/ LSB (/ =  NOT OR INVERSE)?
0038 7E            ADDC A,R6                     ;D/ +B+1 LSB
0039 2B            XCH A,R3                                ;PUT LSB OF B-D IN R3,LSB OF D IN A
003A 37            CPL A                 ;D/ MSB
003B 7F            ADDC A,R7                     ;D/ +B+1(INCLUDES CARRY FROM LSB)
003C 2B            XCH A,R3                      ;SROT OUT MSB,LSB
003D A7            CPL C         ;CARRY IS INVERTED FIX IT
003E 83            RET
003F BD08  MPY:    MOV R5,#08                    ;R2*A INTO R3A SHIFT AND ADD TO MPY -R2 UNCHANGED
0041 97            CLR C
0042 AB            MOV R3,A
0043 27            CLR A
0044 67    MP1:    RRC A         ;REF: PG.3-47 MCS48 ASSLY LANGUAGE INSTR HANDBOOKA
0045 2B            XCH A,R3
0046 67            RRC A
0047 2B            XCH A,R3
0048 E64B          JNC MP2
004A 6A            ADD A,R2
004B ED44  MP2:    DJNZ R5,MP1
004D 67            RRC A     ;NORMALIZE RESULT
004E 2B            XCH A,R3
004F 67            RRC A
0050 83            RET
                                   ;16 BITS (R3,A)*16 BITS (R2,R4)INTO 16 BITS(R3,A)
0051 AF    MPY16:  MOV R7,A           ;USES A,R1,R2,R3,R4,R6,R7 AND INDIR R5 IN MPY.
0052 FA            MOV A,R2           ;MSB OF ANSWER =MSB1 * MSB2
0053 A9            MOV R1,A           ;LSB OF ANSWER =MSB1 * LSB2 +LSB1 * MSB2
0054 FB            MOV A,R3
0055 AE            MOV R6,A
0056 143F          CALL MPY
0058 2C            XCH A,R4
0059 2B            XCH A,R3
005A 2E            XCH A,R6
005B AA            MOV R2,A
005C FB            MOV A,R3
005D 143F          CALL MPY
005F FB            MOV A,R3
0060 6C            ADD A,R4
0061 AC            MOV R4,A
0062 27            CLR A
0063 7E            ADDC A,R6
0064 AE            MOV R6,A
0065 F9            MOV A,R1
0066 AA            MOV R2,A
0067 FF            MOV A,R7
0068 143F          CALL MPY
006A FB            MOV A,R3
006B 6C            ADD A,R4
006C AB            MOV R3,A
006D 27            CLR A
006E 7E            ADDC A,R6
006F 2B            XCH A,R3
0070 83            RET
           ;

0071 97    DSUB2:   CLR C                      ;DSUB2 PUTS @R0,@R0+1-R3,A INTO @R0,@R0+1LR C
```

```
0072 A7          CPL C             ;R0 POINTS TO LSB  ON ENTRY AND EXIT WORKS EXACTLY
0073 37           CPL A                     ;AS DOES DSUB1.
0074 70           ADDC A,@R0
0075 A0           MOV @R0,A
0076 18           INC R0
0077 FB           MOV A,R3
0078 37           CPL A
0079 70           ADDC A,@R0
007A A0           MOV @R0,A
007B C8           DEC R0
007C A7           CPL C
007D 83           RET

0080              ORG 0080H
0080 B82E  NMOD:  MOV R0,#PHIPTR-2                  ; START NOZZEL OFFSET ADJUSTMENTS
0082 A0           MOV @R0,A                ;STORE
0083 FB           MOV A,R3                 ; B**2+C
0084 18           INC R0            ; IN
0085 A0           MOV @R0,A
0086 C8          DEC R0
0087 23AF         MOV A,#NOFFL             ;GET
0089 BB30         MOV R3,#NOFFH            ;NOFF
008B BA30         MOV R2,#NOFFH            ;AND
008D AC           MOV R4,A                 ;MAKE
008E 1451         CALL MPY16               ;NOFF **2
0090 1471         CALL DSUB2               ;SUB FROM B**2+C
0092 BA30         MOV R2,#NOFFH
0094 B93B         MOV R1,#APTR+1           ;POINT TO NOFF
0096 F1           MOV A,@R1                ;FETCH
0097 F7           RLC A             ; 2
0098 143F         CALL MPY          ;NOFF *NOFF *2
009A AC           MOV R4,A                 ;STORE
009B FB           MOV A,R3                 ;IN
009C AF           MOV R7,A                 ;R4 & R5
009D B830         MOV R0,#PHIPTR           ;POINT TO P
009F F0           MOV A,@R0                ;GET IT AND
00A0 3480         CALL SIN                 ;MAKE SIN (P)
00A2 AA           MOV R2,A                         ;PUT IN R2
00A3 18           INC R0                   ;GET
00A4 F0           MOV A,@R0                        ; T
00A5 3480         CALL SIN                         ; SIN (T)
00A7 143F         CALL MPY                         ;SIN (P) * SIN (T)
00A9 2F           XCH A,R7                         ;PREPARE
00AA AA           MOV R2,A                         ;AND
00AB FF           MOV A,R7                         ;MAKE
00AC 1451         CALL MPY16               ;2*NOFF*NOFF*SIN(P)*SIN(T)
00AE B82E        MOV R0,#PHIPTR-2
00B0 1471         CALL DSUB2               ;SUB FROM SQRT TERM
00B2 B93C        MOV R1,#APTR              ;POINT TO VOFF
00B4 F1           MOV A,@R1                        ;GET IT
00B5 E7           RL A                     ; *2
00B6 BA30         MOV R2,#NOFFH
00B8 143F         CALL MPY                         ;NOFF * VOFF * 2
00BA AC           MOV R4,A                         ; STORE
00BB FB           MOV A,R3                         ; IN
00BC AA           MOV R2,A                         ; R4 & R2
00BD B830         MOV R0,#PHIPTR            ;POINT TO FO,#PHIPTR
00BF F0          MOV A,@R0                        ;GET P
00C0 D37F         XRL A,#7FH                       ;90  - P
00C2 3480         CALL SIN                         ;COS (P)
00C4 AB           MOV R3,A
```

```
00C5 27              CLR A
00C6 1451            CALL MPY16                      ;2*VOFF * NOFF * COS (P)
00C8 AD              MOV R5,A                        ;STORE LSB
00C9 C8              DEC R0                  ;GET PRESENT
00CA F0              MOV A,@R0                       ;SQRT TERM
00CB AF              MOV R7,A                        ;AND ADD
00CC AA              MOV R2,A                        ;OR SUBTRACT
00CD C8              DEC R0                  ;NEW TERM
00CE F0              MOV A,@R0                       ;ADD
00CF AE              MOV R6,A                        ;IF
00D0 AC              MOV R4,A                        ;P<90
00D1 FD              MOV A,R5                        ;AND
00D2 76D8            JF1 RODG1                       ;SUB
00D4 1430            CALL DADD1                      ;IF
00D6 04DA            JMP RODG2                       ;P> 90
00D8 1435            RODG1:   CALL DSUB1                     ;NOW HAVE CORRECT SQRT TERM
00DA 83              RODG2:   RET
00DB AF      RPKOD:  MOV R7,A                ;STORE RPRIME*COS P
00DC BA30            MOV R2,#NOFFH
00DE B830            MOV R0,#PHIPTR          ;POINT TO P
00E0 F0              MOV A,@R0               ;GET P
00E1 3480           CALL SIN                 ;SIN (P)
00E3 143F            CALL MPY                ;NOFF * SIN (P)
00E5 F7              RLC A                           ;ROUND TO 8 BITS

00E6 27              CLR A                   ;
00E7 7B              ADDC A,R3               ;
00E8 AA              MOV R2,A                ;PUT IN R2
00E9 2380            MOV A,#CBRRPH           ;CONVERT
00EB 143F            CALL MPY                ;  TO
00ED F7              RLC A                   ; RPRIME
00EE 2B              XCH A,R3                ; FULL
00EF F7              RLC A                   ; SCALE
00F0 6F              ADD A,R7                ;RPRIME*COS(P)+NOFF*SIN(P)
00F1 E6F5            JNC RPCOS               ;IF OVERFLOW
00F3 23FF            MOV A,#0FFH             ;SET = FF

00F5 83      RPCOS:  RET
0100                 ORG 100H
0100 00              DB 0,3,6,9,13,16,19,22
0101 03
0102 06
0103 09
0104 0D
0105 10
0106 13
0107 16
0108 19              DB 25,28,31,34,38,41,44,47
0109 1C
010A 1F
010B 22
010C 26
010D 29
010E 2C
010F 2F
0110 32              DB 50,53,56,59,62,65,68,71
0111 35
0112 38
0113 3B
0114 3E
0115 41
```

```
0116 44
0117 47
0118 4A        204          DB 74,77,80,83,86,89,92,95
0119 4D
011A 50
011B 53
011C 56
011D 59
011E 5C
011F 5F
0120 62        205          DB 98,101,104,107,109,112,115,118
0121 65
0122 68
0123 6B
0124 6D
0125 70
0126 73
0127 76
0128 79        206          DB 121,123,126,129,132,134,137,140
0129 7B
012A 7E
012B 81
012C 84
012D 86
012E 89
012F 8C
0130 8E        207          DB 142,145,147,150,152,155,157,160
0131 91
0132 93
0133 96
0134 98
0135 9B
0136 9D
0137 A0
0138 A2        208          DB 162,165,167,170,172,174,177,179
0139 A5
013A A7
013B AA
013C AC
013D AE
013E B1
013F B3
0140 B5        209          DB 181,183,185,188,190,192,194,196
0141 B7
0142 B9
0143 BC
0144 BE
0145 C0
0146 C2
0147 C4
0148 C6        290          DB 198,200,202,204,206,207,209,211
0149 C8
014A CA
014B CC
014C CE
014D CF
014E D1
014F D3
0150 D5        291          DB 213,2   ,216,218,220,221,223,224
0151 D7
0152 D8
```

```
0153 DA
0154 DC
0155 DD
0156 DF
0157 E0
0158 E2                   DB 226,227,229,230,231,233,234,235
0159 E3
015A E5
015B E6
015C E7
015D E9
015E EA
015F EB
0160 ED                   DB 237,238,239,240,241,242,243,244
0161 EE
0162 EF
0163 F0
0164 F1
0165 F2
0166 F3
0167 F4
0168 F5                   DB 245,246,247,248,248,249,250,250
0169 F6
016A F7
016B F8
016C F8
016D F9
016E FA
016F FA
0170 FB                   DB 251,252,252,253,253,254,254,254
0171 FC
0172 FC
0173 FD
0174 FD
0175 FE
0176 FE
0177 FE
0178 FF                   DB 255,255,255,255,255,255,255,255
0179 FF
017A FF
017B FF
017C FF
017D FF
017E FF
017F FF
0180 A3          SIN:     MOVP A,@A       ;GETS SIN FOR OUT OF PAGE ROUTINES
0181 83                   RET
0190                      ORG 190H
0190 B93C        RUN:     MOV R1,#APTR    ;VARIABLE STORAGE POINTER
0192 99F0                 ANL P1,#0F0H    ;SET MUX ADD. 0 AND START ADC CONVER
0194 BF04                 MOV R7,#04      ;(REQS 25 MICSEC. WAIT FOR CONV.
0196 EF96        HERE:    DJNZ R7,HERE
0198 B830                 MOV R0, #PHIPTR          ;STORAGE POINTER
019A 1414                 CALL FIN        ;GET PHI-PHI IS CALLED P HEREAFTER
019C 8909                 ORL P1,#09      ;       SET MUX ADD.=1(NOW MUST WAIT FOR OPAMP TO SETTLE(
019E A5                   CLR F1                  ;F1=1 IF P>90 DEG.
019F 37                   CPL A
01A0 F2A4                 JB7 NOT90
01A2 37                   CPL A

01A3 B5                   CPL F1
```

```
01A4 37      NOT90:  CPL A
01A5 A0              MOV @R0,A
01A6 18              INC R0
01A7 18              INC R0
01A8 AC              MOV R4,A
01A9 A3              MOVP A,@A
01AA AA              MOV R2,A
01AB 00              NOP
01AC BA10            ORL P2,#10H
01AE 9ADF           ANL P2,#0DFH          ;SET BIT 4=1,BIT 5=0
01B0 0D             MOVD A,P5             ;BRING IN VOFF ADJUST IN LOWER 4BITS OF ACC
01B1 8A30           ORL P2,#30H           ;RESET BITS 4&5 TO 1S
01B3 0339           ADD A,#VOFFH
01B5 A1              MOV ØR1,A
01B6 143F            CALL MPY
01B8 99F7            ANL P1,#0F7H
01BA A0              MOV @R0,A
01BB FB              MOV A,R3
01BC 18              INC R0
01BD A0              MOV @R0,A
01BE FC              MOV A,R4
01BF D37F            XRL A,#7FH
01C1 A3              MOVP A,@A
01C2 18              INC R0
01C3 A0              MOV @R0,A
01C4 AA              MOV R2,A
01C5 00              NOP                  ;HOFF FROM DIP SWITCH
01C6 BA10            ORL P2,#10H          ;SHUT OFF I/O PORTS
01C8 9ADF            ANL P2,#0DFH         ;GET THE OFFSET
01CA 0C             MOVD A,P4
01CB 8A30           ORL P2,#30H
01CD 032B            ADD A,#HOFFH
01CF 19              INC R1
01D0 A1              MOV @R1,A
01D1 143F            CALL MPY
01D3 AC              MOV R4,A
01D4 FB              MOV A,R3
01D5 AA              MOV R2,A
01D6 1414            CALL PIN
01D8 99FE            ANL P1,#0FEH
01DA 890A            ORL P1,#0AH
01DC 37              CPL A
01DD F2E0            JB7 LT90
01DF 37              CPL A
01E0 37      LT90:   CPL A
01E1 B831            MOV R0,#PHIPTR+1
01E3 A0              MOV @R0,A
01E4 A3              MOVP A,@A
01E5 AB              MOV R3,A
01E6 27              CLR A
01E7 1451            CALL MPY16
01E9 99F7            ANL P1,#0F7H
01EB 18              INC R0
01EC 60              ADD A,@R0
01ED AC              MOV R4,A
01EE A0              MOV @R0,A
01EF 18              INC R0
01F0 F0              MOV A,@R0
01F1 7B              ADDC A,R3
01F2 A0              MOV @R0,A
01F3 AA              MOV R2,A
```

```
01F4 AB           MOV R3,A
01F5 FC           MOV A,R4
01F6 1451         CALL MPY16
01F8 18           INC R0
01F9 18           INC R0
01FA A0           MOV @R0,A
01FB 18           INC R0
01FC FB           MOV A,R3
01FD A0           MOV @R0,A
01FE 1414         CALL PIN
0200 890B         ORL P1,#0BH
0202 AB           MOV R3,A
0203 27           CLR A
0204 BA9B         MOV R2,#CRINH
0206 BC59         MOV R4,#CRINL
0208 1451         CALL MPY16          ;CONVERT TO 0 TO RFS
020A BA64         MOV R2,#RZEROH
020C BCA6         MOV R4,#RZEROL
020E 1430         CALL DADD1          ;ADD OFFSET
0210 AC           MOV R4,A
0211 FB           MOV A,R3
0212 AA           MOV R2,A
0213 FC           MOV A,R4
0214 1451         CALL MPY16          ;MAKE R SQUARED
0216 AE           MOV R6,A
0217 FB           MOV A,R3
0218 AF           MOV R7,A
0219 BD6D         MOV R5,#RMINE
021B BCFF         MOV R4,#RMAXE
021D 4623         JNT1 EXTEN
021F BD2D         MOV R5,#RMINNE
0221 BC98         MOV R4,#RMAXNE
0223 37     EXTEN: CPL A
0224 6D           ADD A,R5
0225 E62C         JNC NOTLOW
0227 FD           MOV A,R5
0228 AF           MOV R7,A
0229 85           CLR F0              ;SET R = RMIN AND SET ALARM FLAG
022A 4434         JMP NOTHI           ;JUMP AROUND HIGH CHECK
022C FB    NOTLOW: MOV A,R3
022D 37           CPL A
022E 6C           ADD A,R4            ;R - RMAX
022F F634         JC NOTHI            ;OK IF NO CARRY
0231 FC           MOV A,R4
0232 AF           MOV R7,A
0233 85           CLR F0              ;SET R = RMAX AND SET ALARM FLAG
0234 B93D   NOTHI: MOV R1,#APTR+1
0236 F1           MOV A,@R1
0237 AA           MOV R2,A
0238 143F         CALL MPY
023A 1435         CALL DSUB1
023C AE           MOV R6,A
023D FB           MOV A,R3
023E AF           MOV R7,A
023F C9           DEC R1
0240 F1           MOV A,@R1
0241 AA           MOV R2,A
0242 143F         CALL MPY
0244 1435         CALL DSUB1
0246 AC           MOV R4,A
```

```
0248 AA               MOV R2,A
0249 C8               DEC R0
024A F0               MOV A,@R0
024B 1430             CALL DADD1
024D 1480             CALL NMOD
024F 7400             CALL DSQRT               ;CALL SQUARE ROOT SUBROUTINE
0251 AE               MOV R6,A                 ;LO BYTE TO R6
0252 F3               MOV A,R3                 ; HI BYTE
0253 AF               MOV R7,A                 ;TO R7
0254 B833             MOV R0,#PHIPTR+3
0256 F0               MOV A,@R0
0257 AB               MOV R3,A
0258 C8               DEC R0
0259 F0               MOV A,@R0
0234 1435             CALL DSUB1
023C AE               MOV R6,A
024D FB               MOV A,R3
024E AF               MOV R7,A
024F BB50             MOV R3,#ARMLNH
0241 23F5             MOV A,#ARMLNL
0242 1435             CALL DSUB1
0265 5472             JT1 NEX
0267 AE               MOV R6,A
0268 FB               MOV A,R3
0269 AF               MOV R7,A
026A BB45             MOV R3,#EXLFNH
026C 2378             MOV A,#EXLENL
026E 1435             CALL DSUB1
0270 F674             JC UFLO
0272 E678      NEX:   JNC GOOD2
0274 BB00      UFLO:  MOV R3,#0
0276 27               CLR A
0277 85               CLR F0            ;SET LED FOR CROSSING THE LOWER LIMIT
0278 BA9C      GOOD2: MOV R2,#CBRSRH
027A BC25             MOV R4,#CBRSRL
027C 1451             CALL MPY16
027E F7               RLC A
027F 2B               XCH A,R3
0280 F7               RLC A
0281 2B               XCH A,R3
0282 F7               RLC A
0283 2B               XCH A,R3
0284 F7               RLC A
0285 E68A             JNC NOFLO         ;JUMP ON NO OVERFLOW
0287 23FF             MOV A,#0FFH       ;SET SMALL R TO FULL SCALE
0289 85               CLR F0            ;SET ALARM FLAG
028A 2B        NOFLO: XCH A,R3
028B F7               RLC A
028C 27               CLR A
028D 6B               ADD A,R3
028E 1423             CALL POUT
0290 996F             ANL P1,#6FH
0292 8910             ORL P1,#10H
0294 B699             JF0 RPRIME        ;JUMP IF NO ALARM
0296 8980             ORL P1,#080H
0298 95               CPL F0            ;SET ALARM AND CLEAR ALARM FLAG
               ;
0299 99F7      RPRIME: ANL P1,#0F7H
               ;       MOV R0,#PHIPTR+4
029B BA68             MOV R2,#CSRBRH
029D BC7A             MOV R4,#CSRBRL
```

```
029F B903           MOV R1,#03              ;WAIT A TO D
02A1 E9A1    WAIT:  DJNZ R1,WAIT
02A3 1414           CALL PIN               ;GET SMALL R
02A5 B834           MOV R0,#FHIPTR+4       ;STORAGE POINTER
02A7 8908           ORL P1,#08              ;CLEAR ADC CONVERT COMMAND
02A9 AB             MOV R3,A
02AA 27             CLR A
02AB 1451           CALL MPY16              ;CONVERT SCALE
02AD BA50           MOV R2,#ARMLNH
02AF BCF5           MOV R4,#ARMLNL
02B1 1430           CALL DADD1              ;ADD ARM ZERO LENGHT
02B3 56BB           JT1 EXNOT               ;IF EXTENDED
02B5 BA45           MOV R2,#EXLENH          ;ADD
02B7 BC78           MOV R4,#EXLENL          ;EXTENSION LENGTH
02B9 1430           CALL DADD1
02BB BA80    EXNOT: MOV R2,#CBRRPH
02BD BC00           MOV R4,#CBRRPL
02BF 1451           CALL MPY16     ;CONVERT TO CORRECT SCALE FOR RPRIME
02C1 F7             RLC A                  ;ADJUST FOR
02C2 2B             XCH A,R3                ;FACTOR
02C3 F7             RLC A                  ; OF 2
02C4 2B             XCH A,R3                ;IN CONVERSION
02C5 E6CA           JNC RPOK                ;IF OVERFLOWED
02C7 BBFF           MOV R3,#0FFH            ;SET RPRIME
02C9 27             CLR A                  ;TO FULL SCALE (ALMOST)
02CA AC      RPOK:  MOV R4,A                ;STORE
02CB F7             RLC A                  ;IN
02CC FB             MOV A,R3                ;R4 AND
02CD AA             MOV R2,A                ;R2
02CE 27             CLR A                  ;AND
02CF 7B             ADDC A,R3               ;ROUND TO 8 BITS
02D0 1423           CALL POUT              ;OUT TO LATCH
02D2 99DB           ANL P1,#0DBH            ;STROBE INTO DAC
02D4 8920           ORL P1,#20H             ;AND SET MUX ADDR O
02D6 F0             MOV A,@R0               ;GET COS(P)
02D7 AB             MOV R3,A                ;AND
02D8 27             CLR A                  ;MAKE
02D9 1451           CALL MPY16              ;RPRIME * COS (P)
02DB F7             RLC A                  ;NOW
02DC 27             CLR A                  ;ROUND
02DD 7B             ADDC A,R3               ;IT TO 8 BITS
02DE 14DB           CALL RPMOD
02E0 1423           CALL POUT              ;OUT TO LATCH
02E2 99BF           ANL P1,#0BFH            ;STROBE
02E4 8940           ORL P1,#40H             ;INTO DAC
02E6 2490           JMP RUN                ;BACK TO BEGINNING
             ;
0300                ORG 300H
0028         SQRPT  EQU    40
                    ;SQRPT        LO BYTE RESIDUE
                    ;SQRPT+1   HI BYTE RESIDUE
                    ;SQRPT+2   LO BYTE OF ANSWER
                    ;SQRPT+3   HI BYTE   ANSWER
0300 B928    DSQRT: MOV R1,#SQRPT
0302 A1             MOV @R1,A      ;STORE LO BYTE OF OPERAND
0303 FB             MOV A,R3
0304 19             INC R1         ;POINTER R1 POINTING TO HI BYTE RESIDUE
0305 A1             MOV @R1,A      ;STORE HI BYTE OF OPERAND
0306 27             CLR A
                    INC R1         ;POINTER POINTING TO LO BYTE OF ANSWER
```

```
0309 19              INC R1
030A A1              MOV @R1,A          ;CLR HI BYTE OF ANSWER
030B BD08            MOV R5,#08H        ;COUNTING THE #OPERATIONS
030D 00      SQRTX:  NOP
030E 746F            CALL SQRAN         ;LOAD PARTIAL ANSWER TO R3,A & PREPARE FOR SUBTRACT
0310 AF              MOV R7,A           ;LO BYTE OF P.A. WHICH IS 0000 0001 TO START WITH
0311 FD              MOV A,R5           ;#ROTATIONS REQUIRED= 2*(COUNTER-1)
0312 07              DEC A
0313 E7              RL A
0314 C61E            JZ SQRTX2          ;IF ZERO THEN FIRST EIGHT BITS OF NUMBER DONE
0316 AE              MOV R6,A           ;R6=2*(COUNTER-1)
0317 FF              MOV A,R7           ;RETURN LO BYTE OF TEST TO A
0318 00      SQRTX1: NOP
0319 7469            CALL SQRL          ;ROTATE LEFT R6 NUMBER OF TIMES
031B EE18            DJNZ R6,SQRTX1
031D AF              MOV R7,A           ;TEST NUMBER LO BYTE TO R7
031E B928    SQRTX2: MOV R1,#SQRPT      ;R1 HAS THE ADDRESS OF LO BYTE OF RESIDUE
0320 F1              MOV A,@R1
0321 AE              MOV R6,A           ;R6 = LO BYTE OF RESIDUE
0322 19              INC R1             ;POINTER TO HI BYTE OF RESIDUE
0323 F1              MOV A,@R1          ;
0324 2F              XCH A,R7           ;R7=HI & A=LO BYTE OF RESIDUE
0325 1435            CALL DSUB1         ;SUBTRACT, C=0 IF  SUBTRACTION OK
0327 747B            CALL SQTST         ;TEST SUBTRACTION AND ADJUST THE ANSWER & RESIDUE
0329 ED0D            DJNZ R5,SQRTX      ;JUMP TO BEGINING IF R5 <>0, R5 WAS 8 TO START
032B BD08            MOV R5,#08H        ;RESET COUNTER BACK TO 8 FOR THE LAST 8 BITS OF OPRAND
032D 00      SQRTY:  NOP
032E FD              MOV A,R5           ;
032F 07              DEC A
0330 E7              RL A
0331 37              CPL A              ;2*(COUNTER-1)
0332 0310            ADD A,#010H        ;16-2*(COUNTER-1)
0334 AE              MOV R6,A           ; R6=# TIMES TEST BYTES TO BE ROTATED RIGHT
0335 746F            CALL SQRAN         ;ANSWER IN R3,A--SHIFT LEFT 2 & ADD 1
0337 00      SQRTY1: NOP
0338 7464            CALL SQRR          ;ANSWER SHIFTED RIGHT #TIMES IN R6
033A 97              CLR C
033B EE37            DJNZ R6,SQRTY1     ;CHECK R6
033D 7464            CALL SQRR          ;ONE MORE ROTATION RIGHT
033F 1300            ADDC A, #00H       ;ROUND OFF THE RESULT
0341 E644            JNC SQRTY3          ;IF THERE IS A CARRY
0343 1B              INC R3             ;THEN IT MUST BE ADDED TO R3
0344 97      SQRTY3: CLR C              ;OTHERWISE R3 IS LEFT AS IS
0345 AF              MOV R7,A           ;LO BYTE OF TEST
0346 B928            MOV R1,#SQRPT
0348 F1              MOV A,@R1
0349 AE              MOV R6,A
034A 19              INC R1
034B F1              MOV A,@R1
034C 2F              XCH A,R7
034D 9657            JNZ SQRTY2                ;A IS NON ZERO
034F 2B              XCH A,R3                  ;TEST R3 FOR ZERO,
0350 9654            JNZ SQRTY4                ;R3 WAS NON ZERO,RESTORE A AND R3, THEN SUBTRACT
0352 97              CLR C                     ;A=R3=0, CARRY IS SET TO 1 1, TO FLAG INVALID SUBTRACT
0353 A7              CPL C
0354 6459            JMP SQRTY5
0356 2B      SQRTY4: XCH A,R3                  ;RESTORE R3 AND ACC
0357 1435    SQRTY2: CALL DSUB1
0359 747B    SQRTY5: CALL SQTST
035B ED2D            DJNZ R5,SQRTY
035D B92B            MOV R1,#SQRPT+3
```

```
035F F1           MOV A,@R1
0360 AB           MOV R3,A
0361 C9           DEC R1
0362 F1           MOV A,@R1
0363 83           RET
0364 2B   SQRR:   XCH A,R3         ;SUBROUTINE ROTATES RIGHT 1 R3,A
0365 67           RRC A
0366 2B           XCH A,R3
0367 67           RRC A
0368 83           RET
0369 97   SQRL:   CLR C            ;SUBROUTINE SHIFTS LEFT 1--R3,A
036A F7           RLC A
036B 2B           XCH A,R3
036C F7           RLC A
036D 2B           XCH A,R3
036E 83           RET
036F B92B SQRAN:  MOV R1,#SQRPT+3          ;BRINGS DOWN PARTIAL
0371 F1           MOV A,@R1                ;ANSWER TO R3,A
0372 AB           MOV R3,A
0373 C9           DEC R1                   ;ROTATES LEFT
0374 F1           MOV A,@R1                ;TWICE AND ADD 1
0375 7469         CALL SQRL
0377 7469         CALL SQRL
0379 17           INC A                    ;R3=HI BYTE OF ANSWER
037A 83           RET                      ;R1=LO BYTE OF ANSWER
037B A7   SQTST:  CPL C                    ;C=1 MEANS SUBTRACTION OK
037C E684         JNC SQTST1               ;SUBTRACTION NOT OK THEN JUMP TO SQTST1
037E B928         MOV R1,#SQRPT
0380 A1           MOV @R1,A                ;STORE THE RESULT AFTER SUBTRACTION
0381 19           INC R1                   ;IN RESIDUE
0382 FB           MOV A,R3                 ;STORAGE AREA
0383 A1           MOV @R1,A
0384 B92A SQTST1: MOV R1,#SQRPT+2
0386 F1           MOV A,@R1                ;SHIFT LEFT
0387 F7           RLC A                    ;BY ONE AND
0388 A1           MOV @R1,A                ; ADD 1
0389 19           INC R1                   ;ONLY WHEN
038A F1           MOV A,@R1                ;SUBTRACTION
038B F7           RLC A                    ;WAS OK
038C A1           MOV @R1,A
038D 83           RET
               ;
                  END
```

USER SYMBOLS

```
APTR   003C  ARMLEN 0094  ARMLNH 0050  ARMLNL 00F5  CBRRPH 0080  CBRRPL 0000  CBRSRH 009C
CBRSRL 0025  CRINH  009B  CRINL  0059  CBRBRH 0068  CSRBRL 007A  DADD1  0030  DSQRT  0300
DSUB1  0035  DSUB2  0071  EXLEN  007F  EXLENH 0045  EXLENL 0078  EXNOT  02BB  EXTEN  0223
GOOD2  0278  HERE   0196  HOFF   0054  HOFFH  002D  HOFFL  00F2  LT90   01E0  MP1    0044
MP2    004B  MPY    003F  MPY16  0051  MEX    0272  NOT90  01A4  NMOD   0080  NOFF   0059
NOFFH  0030  NOFFL  00AF  NOFLO  028A  NOTHI  0234  NOTLOW 022C  PHIPTR 0030  PIN    0014
POUT   0023  RFS    00EA  RMAXE  00FF  RMAXNE 0098  RMINE  006D  RMINNE 002D  RODG1  00D8
RODG2  00DA  RPCOS  00F5  RPFS   00E9  RPMOD  00DB  RPOK   02CA  RPRIME 0299  RRANGE 008E
RUN    0190  RZERO  005C  RZEROH 0064  RZEROL 00A6  SIN    0180  SQRAN  036F  SQRL   0369
SQRPT  0028  SQRR   0364  SQRTX  030D  SQRTX1 0318  SQRTX2 031E  SQRTY  032D  SQRTY1 0337
SQRTY2 0357  SQRTY3 0344  SQRTY4 0356  SQRTY5 0359  SQTST  037B  SQTST1 0384  START  000A
TRAVEL 00BF  UFLO   0274  VOFF   006A  VOFFH  0039  VOFFL  00FB  WAIT   02A1
```

What we claim is:

1. A control system for adaptably controlling movement of a control arm in a generally curved enclosure of a nuclear steam generator, said control arm being removably attached at a pivot end to a pivot mechanism fixed in location a first predetermined distance from the center of said enclosure and being free for movement at an end having a nozzle configuration movably affixed thereto for directing an abrasive mixture toward at least one curved surface of said enclosure for removal of radioactive contaminates therefrom, said control system comprising:

horizontal drive means for governing horizontal pivotal motion of said control arm about said pivot end;

vertical drive means for governing vertical pivotal motion of said control arm about said pivot end;

axial drive means for governing axial motion of said nozzle configuration along said control arm; and automatic control means connected to said horizontal, vertical, and axial drive means for automatically controlling both the position of said nozzle configuration relative to said center and the angular velocity of said control arm so as to control the spacing of said nozzle configuration from said surface and the tangential velocity at which said nozzle configuration moves over said surface so as to provide substantially uniform cleaning of said surface.

2. A control system according to claim 1 wherein said horizontal drive means comprises a horizontal drive motor receiving a horizontal drive signal from said automatic control means and means for providing to said automatic control means a horizontal position feedback signal and a horizontal velocity feedback signal.

3. A control system according to claim 2 wherein said vertical drive means comprises a vertical drive motor receiving a vertical drive signal from said automatic control means and means for providing a vertical position feedback signal and a vertical velocity feedback signal to said automatic control means.

4. A control system according to claim 3 wherein said axial motion means comprises:

a support carriage for slidably supporting said tool on said control arm;

an axial drive motor for moving said carriage along said control arm, said axial drive motor receiving an axial drive signal from said automatic control means; and means for providing an axial position feedback signal to said automatic control means.

5. A control system according to claim 4 wherein said automatic control means comprises a digital computer programmed to receive said feedback signals from said horizontal, vertical, and axial drive means, to process said feedback signals, and to generate said drive signals to said horizontal, vertical, and axial drive motors, so that said tool is caused to sweep at a constant position and tangential velocity relative to said surface of said enclosure.

6. A control system according to claim 5 wherein said digital computer comprises software programs arranged to:

adjust said control arm incrementally to a vertical position; and sweep said control arm horizontally across said surface at a predetermined tangential velocity while maintaining constant vertical position and continuously adjusting the axial position of said nozzle configuration to maintain said nozzle configuration at a predetermined distance from said surface.

7. A control system according to claim 6 wherein said digital computer further comprises software programs which may be adapted to varying enclosure geometries of different models of nuclear steam generators.

8. A control system for governing the movement of a control arm in a spherical enclosure of a nuclear steam generator having a center, said control arm having a pivot end and a nozzle configuration for directing an abrasive mixture towards the surfaces of said enclosure for removing radioactive contaminates therefrom, said nozzle configuration slidably mounted on said control arm with variation in the linear radius from said pivot end, said pivot end being coupled to a pivot mechanism inside said spherical enclosure and being fixed in position a first predetermined distance from the center of said spherical enclosure, said control arm movable about said pivot mechanism with controlled variation in horizontal and vertical angular position and angular velocity, said control system comprising:

tangential velocity means for providing a first setpoint signal proportional to a predetermined tangential velocity at which said nozzle configuration moves relative to the surfaces of said enclosure, means for providing a first feedback signal proportional to the actual linear radius of said nozzle configuration;

means for providing a second feedback proportional to the actual angular position of said control arm;

means responsive to said first and second feedback signals for providing a third feedback signal proportional to the effective radius of said nozzle configuration;

angular velocity means responsive to said first setpoint signal and said third feedback signal for providing a second setpoint signal proportional to an angular velocity necessary to cause said nozzle configuration to move at said predetermined tangential velocity;

drive means responsive to said second setpoint signal for angularly moving said control arm about said pivot mechanism at said angular velocity; and adjusting means responsive to said second feedback signal for adjusting the linear radius to maintain a predetermined distance between said nozzle configuration and said surfaces, said control system providing substantially uniform cleaning of said surfaces.

9. A control system according to claim 8 wherein said drive means includes:

means for sweeping said control arm horizontally along a first predetermined path; and means for incrementally sweeping said control arm vertically along a second predetermined path at an end of said first predetermined path.

10. A control system according to claim 1 wherein said drive means includes:

means for sweeping said control arm vertically along a predetermined path;

and wherein said adjusting means includes:

means for incrementally adjusting the linear radius of said nozzle configuration at an end of said predetermined path and maintaining said incremental adjustment along said predetermined path.

11. A control system according to claim 10 wherein said drive means further includes means for fixing the horizontal position of said control arm.

12. A control system according to claim 8 wherein said drive means includes:

means for sweeping said control arm horizontally along a predetermined path;

and wherein said adjusting means includes:

means for incrementally adjusting the linear radius of said nozzle configuration at an end of said predetermined path and maintaining said incremental adjustment along said predetermined path.

13. A control system according to claim 12 wherein said drive means further includes means for fixing the vertical position of said control arm.

14. Apparatus in a plenum of a nuclear steam generator for directing a cleaning mixture onto the surfaces in said plenum, said plenum having a divider plate and divider plate surface, a tubesheet and a tubesheet surface, and a bowl and a bowl surface, said plenum having a spherical center with respect to said bowl surface, said apparatus comprising:

a pivot mechanism fixed in position a first predetermined distance from said spherical center;

a nozzle configuration means for alternately directing said cleaning mixture onto said bowl, dividing plate, and tubesheet surfaces;

drive means for angularly moving said nozzle configuration about said pivot mechanism at a predetermined tangential velocity relative to said surfaces; and adjusting means responsive to a radius control signal for adjusting the linear radius of said nozzle configuration with respect to said pivot mechanism so as to maintain a second predetermined distance between said nozzle configuration means and said surfaces, said apparatus providing substantially uniform cleaning of said surfaces.

15. Apparatus according to claim 14 wherein said nozzle configuration means includes:

a control arm having a pivot end, said pivot end having freedom of movement in vertical and horizontal directions;

a nozzle support carriage slidably mounted on said control arm;

a nozzle configuration slidably mounted on said nozzle support carriage, for directing said cleaning mixture toward the surfaces of said plenum; and flexible hosing attached to said nozzle configuration for providing a circuit for said cleaning mixture to reach said nozzle configuration.

16. Apparatus according to claim 15 wherein said drive means includes:

first potentiometer means for providing a first signal being proportional to a predetermined tangential velocity;

first position feedback means for determining the actual linear radius of said nozzle configuration;

second position feedback means for determining the angular position of said nozzle configuration;

first microprocessor means for providing a second signal proportional to the effective radius of said nozzle configuration as a function of said actual linear radius and of said angular position;

means responsive to said first and second signals for providing a third signal proportional to an instructed angular velocity of said control arm varying so as to maintain said predetermined tangential velocity of said nozzle configuration in relation to said bowl surface;

first velocity feedback means for providing a fourth signal proportional to the actual angular velocity of said control arm;

first drive means including first electric motor means for angularly sweeping said control arm about said pivot mechanism at said instructed angular velocity, said first drive means also including first feedback control means including first proportional controller means responsive to said third and fourth signals for controlling the movement of and the angular velocity of said first electric motor means; and second microprocessor means for providing said radius control signal as a function of an instructed linear radius of said nozzle configuration and said angular position.

17. Apparatus according to claim 16 wherein said adjusting means includes:

second drive means including second electric motor means for adjusting the linear radius of said nozzle configuration, said second drive means also including a second feedback control means including second proportional controller means responsive to said radius control signal and said actual linear radius for controlling the movement of said second electric motor means.

18. Apparatus according to claim 17 wherein said second microprocessor means includes means for maintaining said second predetermined distance between the center of said spherical enclosure and said nozzle configuration.

19. Apparatus according to claim 18 wherein said first electric motor means includes a first electric motor for sweeping said control arm in a horizontal direction, and a second electric motor for sweeping said control arm in a vertical direction; and wherein said first proportional controller means includes a first feedback controller coupled to said first electric motor, and a second feedback controller coupled to said second electric motor; and wherein said second position feedback means includes a second potentiometer means coupled to said first electric motor, and a third potentiometer means coupled to said second electric motor; and wherein said first velocity feedback means includes means coupled to said first electric motor for sensing the back emf of said first electric motor, and tachometer means coupled to said second electric motor; and wherein said second electric motor means includes a third electric motor for adjusting the linear radius of said nozzle configuration; and wherein said second proportional controller means includes a third feedback controller coupled to said third electric motor; and wherein said first position feedback means includes a fourth potentiometer means.

* * * * *